United States Patent
Lee et al.

(10) Patent No.: US 11,821,695 B2
(45) Date of Patent: Nov. 21, 2023

(54) LAMINATE FOR RADIATIONAL COOLING AND MATERIAL FOR RADIATIONAL COOLING CONTAINING THE SAME

(71) Applicants: HYUNDAI MOTOR COMPANY, Seoul (KR); KIA CORPORATION, Seoul (KR)

(72) Inventors: Min Jae Lee, Seongnam-si (KR); Deok Woo Yun, Hwaseong-si (KR); Sung Wan Jeon, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/833,581

(22) Filed: Jun. 6, 2022

(65) Prior Publication Data

US 2023/0258417 A1    Aug. 17, 2023

(30) Foreign Application Priority Data

Feb. 14, 2022    (KR) .................. 10-2022-0019146

(51) Int. Cl.
   *F28F 13/18*    (2006.01)
(52) U.S. Cl.
   CPC ........ *F28F 13/185* (2013.01); *F28F 2245/06* (2013.01)
(58) Field of Classification Search
   CPC ................... F28F 2245/06; F28F 13/185
   See application file for complete search history.

(56) References Cited

U.S. PATENT DOCUMENTS

| | | | |
|---|---|---|---|
| 5,405,680 A | * | 4/1995 | Chang .................. C09D 5/00 428/404 |
| 8,530,004 B2 | | 9/2013 | Huang et al. |
| 10,323,151 B2 | | 6/2019 | Van Overmeere et al. |
| 2015/0361599 A1 | | 12/2015 | Minor |
| 2020/0053856 A1 | * | 2/2020 | Barber ................ H05B 47/105 |
| 2021/0010764 A1 | | 1/2021 | Yang et al. |

FOREIGN PATENT DOCUMENTS

| | | | |
|---|---|---|---|
| CN | 212280249 U | * | 1/2021 |
| KR | 102154072 B1 | | 9/2020 |
| KR | 1020210000278 A | | 1/2021 |

(Continued)

OTHER PUBLICATIONS

Three Dimensional Printable Nanoporous Polymer Matrix Composites for Daytime Radiative Cooling, Zhou et al., Nano Lett. 2021, 21, 1493-1499.*

(Continued)

*Primary Examiner* — Devon Russell
(74) *Attorney, Agent, or Firm* — MCDONNELL BOEHNEN HULBERT & BERGHOFF LLP

(57) ABSTRACT

The present disclosure relates to a laminate for radiational cooling including a substrate layer containing a matrix of an infrared light-radiating polymer containing polycarbonate-based polyurethane and particles of a visible light-reflecting inorganic material, and an ultraviolet light-reflecting coating layer formed on the substrate layer and containing an expanded fluorine-based polymer, wherein the ultraviolet light-reflecting coating layer is porous.

11 Claims, 8 Drawing Sheets

A

(56) References Cited

FOREIGN PATENT DOCUMENTS

KR          102225804 B1    3/2021
KR     1020210109312 A      9/2021

OTHER PUBLICATIONS

The effects of particle size distribution on the optical properties of titanium dioxide rutile pigments and their applications in cool non-white coatings, Solar energy materials and solar cells, vol. 130, Nov. 201, p. 42-50.*
Enhancing infrared emission behavior of polymer coatings for radiative cooling applications, J. Phys. D:P Appl. Phys. 54, 2021, 295501.*
Highly Solar-Reflective Structures for Daytime Radiative Cooling under High Humidity, Zhong et al., 2020, ACS Appl Mater. Interfaces, 2020, 12, 51409-51417.*
Expanded PTFE Applications Handbook, 2017, Chapter 3.4.*

\* cited by examiner

LAMINATE FOR RADIATIONAL COOLING AND MATERIAL FOR RADIATIONAL COOLING CONTAINING THE SAME

CROSS-REFERENCE TO RELATED APPLICATION

This application claims the benefit of priority to Korean Patent Application No. 10-2022-0019146, filed in the Korean Intellectual Property Office on Feb. 14, 2022, the entire contents of which are incorporated herein by reference.

TECHNICAL FIELD

The present disclosure relates to a laminate for radiational cooling that has excellent flexibility, has a thickness providing for easy control, and has excellent infrared light radiability and ultraviolet light reflectivity, and a radiational cooling material containing the same.

BACKGROUND

In general, the consumption of energy is essential for cooling. For example, general purpose cooling devices such as a refrigerator, an air conditioner, and the like compress a refrigerant using the energy and then perform the cooling using absorption of heat occurred when the compressed refrigerant is expanded. Radial cooling is a technology for the cooling without consuming the energy, unlike the general-purpose cooling devices. In order to improve a radiational cooling efficiency, it is important to well control absorbency, reflectivity, and emissivity of light in each wavelength band. Most of the heat comes from incident sunlight, and the sunlight is divided into ultraviolet (UV) light, visible light, and infrared light. When reflecting the light in each wavelength band, it is possible to block inflow of the heat through the sunlight. For example, during the day when the sun is shining, an internal temperature of a black vehicle that absorbs the light well will easily increase, but an internal temperature of a white vehicle that does not absorb the light relatively and reflects the light well will increase in a relatively slow manner.

As a material for such radiational cooling, various materials such as a polymer, a multilayer thin film of an inorganic material or a ceramic material, a radiational cooling material including a metal reflective layer, and a paint containing a white pigment are being used. The polymer material generally has a high absorption rate (radiation rate) with respect to the infrared light, but has a short lifespan by being easily deteriorated by the ultraviolet light, moisture, and the like when left outdoors because of the nature of the material. In the case of the multilayer thin film, the number of layers must be increased to increase the radiation rate with respect to the infrared light, which increases an absorption rate of the sunlight, thereby making it difficult to achieve a high-efficiency radiational cooling performance. In addition, the material including the metal reflective layer is difficult to be applied in real life because of problems of low long-term stability resulted from oxidation of the metal and a unit cost, and such metal material causes eye fatigue and light blur because of specular reflection. The paint containing the white pigment is not usually composed of a material having a high extinction coefficient, and thus, has insufficient infrared light radiation rate and ultraviolet light reflection rate, so that a radiational cooling ability is insufficient.

As an alternative to such a problem, Korean Patent No. 2154072 (Patent Document 1) discloses a coolant capable of realizing a color in the radiational cooling, containing a first material that causes the radiational cooling by emitting the infrared light, and a second material that absorbs light in a visible light region, changes a wavelength of the light, and emits the light whose wavelength is changed. However, as in Patent Document 1, the coolant in which the second material such as a dye, a semiconductor material, or the like is mixed with the first material that emits the infrared light by electromagnetic resonance has a problem in that the ultraviolet light reflection rate is low, and thus the radiational cooling ability is insufficient.

Therefore, there is a need for research and development of a material that has excellent flexibility, has a thickness providing for easy control, and has excellent infrared light radiability and ultraviolet light reflectivity to have the excellent radiational cooling ability.

SUMMARY

The present disclosure has been made to solve the above-mentioned problems occurring in the prior art while advantages achieved by the prior art are maintained intact.

An aspect of the present disclosure provides a laminate that has excellent flexibility, has a thickness providing for easy control, and has excellent infrared light radiability and ultraviolet light reflectivity to have an excellent radiational cooling ability, and a radiational cooling material containing the same.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a laminate for radiational cooling includes a substrate layer containing a matrix of an infrared light-radiating polymer containing polycarbonate-based polyurethane and particles of a visible light-reflecting inorganic material, and an ultraviolet light-reflecting coating layer formed on the substrate layer and containing an expanded fluorine-based polymer, wherein the ultraviolet light-reflecting coating layer is porous.

According to another aspect of the present disclosure, a radiational cooling material contains the laminate for the radiational cooling.

According to another aspect of the present disclosure, a vehicle contains the radiational cooling material.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

In the present specification, when a certain portion "includes" a certain component, this means that other components may be further included without being excluded unless otherwise stated.

In the present specification, when a first member is said to be located on a "surface" of or "on" a second member, this includes not only a case in which the first member is in contact with the second member, but also a case in which a third member exists between the two members.

Laminate for Radiational Cooling

A laminate for radiational cooling according to the present disclosure includes a substrate layer containing a matrix of an infrared light-radiating polymer and particles of a visible light-reflecting inorganic material, and an ultraviolet light-reflecting coating layer.

Figure 1:
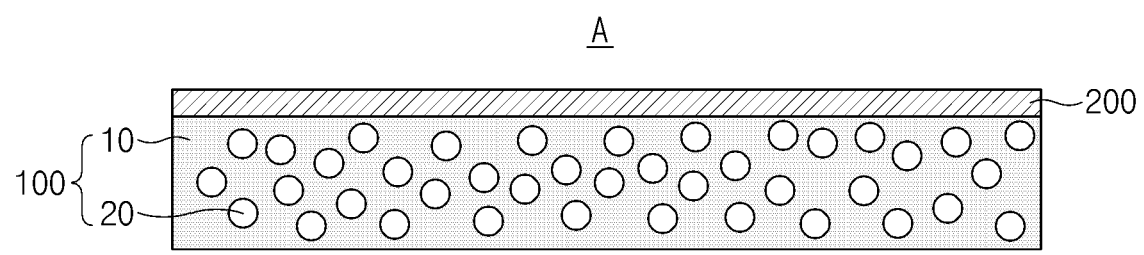
FIG. 1 is a cross-sectional view of a laminate for radiational cooling according to an embodiment of the present disclosure.

Referring to FIG. 1, a laminate A for the radiational cooling according to the present disclosure may include a substrate layer 100 and an ultraviolet light-reflecting coating layer 200 formed on the substrate layer 100. The substrate layer 100 may contain a matrix 10 of an infrared light-radiating polymer and particles 20 of a visible light-reflecting inorganic material.

Substrate Layer

The substrate layer serves to emit heat via visible light reflection and infrared light radiation. In this regard, the substrate layer contains the matrix of the infrared light-radiating polymer and the particles of the visible light-reflecting inorganic material. Referring to FIG. 1, the substrate layer 100 may be in a form in which the particles 20 of the visible light-reflecting inorganic material are dispersed in the matrix 10 of the infrared light-radiating polymer.

The infrared light-radiating polymer serves to lower a temperature of the laminate by radiating the heat of the laminate in a form of infrared light and exporting the heat to space.

The infrared light-radiating polymer includes polycarbonate-based polyurethane (PCU). In this regard, the polycarbonate-based polyurethane is a polymer prepared by reacting a polyol containing polycarbonate with a polyisocyanate. Because the infrared light-radiating polymer contains the PCU, there is an effect of effectively absorbing an infrared light wavelength to increase a radiation rate.

The polycarbonate-based polyurethane may have a weight-average molecular weight (Mw) in a range from 450 g/mol to 4,500 g/mol, specifically, in a range from 600 g/mol to 3,000 g/mol. When the weight-average molecular weight of the polycarbonate-based polyurethane is within the above range, an infrared light radiation rate is excellent.

The visible light-reflecting inorganic material serves to lower the temperature of the laminate by reflecting visible light incident on the laminate.

In addition, the visible light-reflecting inorganic material may include at least one selected from a group consisting of $TiO_2$, $SiO_2$, ZnO, $CaCO_3$, $BaSO_4$, and $Al_2O_3$. Specifically, the visible light-reflecting inorganic material may include at least one selected from a group consisting of $TiO_2$, $SiO_2$, and ZnO.

The particles of the visible light-reflecting inorganic material may have an average particle diameter in a range from 50 nm to 1,500 nm. Specifically, the particles of the visible light-reflecting inorganic material may have an average particle diameter in a range from 200 nm to 1,200 nm or in a range from 200 nm to 800 nm. When the average particle diameter of the particles of the visible light-reflecting inorganic material is less than the above range and exceeds the above range, because a visible light scattering effect is lowered, the reflection rate may be reduced.

A shape of the particles of the visible light-reflecting inorganic material is not particularly limited as long as the material is an inorganic material that reflects the visible light. For example, the particles may be spheric or amorphous, and specifically, may be spherical.

The substrate layer may contain the visible light-reflecting inorganic material and the infrared light-radiating polymer in a weight ratio of 0.5 to 5.0:1, a weight ratio of 0.8 to 4.0:1, or a weight ratio of 1.0 to 3.0:1. When the weight ratio of the visible light-reflecting inorganic material and the infrared light-radiating polymer is less than the above range, that is, when a small amount of the visible light-reflecting inorganic material is contained with respect to a weight of the infrared light-radiating polymer, a visible light reflection rate may be reduced. In addition, when the weight ratio of the visible light-reflecting inorganic material and the infrared light-radiating polymer exceeds the above range, that is, when an excessive amount of the visible light-reflecting inorganic material is contained with respect to the weight of the infrared light-radiating polymer, infrared light radiation rate may be reduced.

In addition, the substrate layer may have an average thickness in a range from 200 μm to 1 mm, in a range from 300 μm to 600 μm, or in a range from 300 μm to 400 μm. When the average thickness of the substrate layer is less than the above range, the temperature of the laminate may increase as the visible light reflection rate is reduced or the infrared light radiation rate is reduced. When the average thickness of the substrate layer exceeds the above range, flexibility of the manufactured laminate may be lowered.

Ultraviolet Light-Reflecting Coating Layer

The ultraviolet light-reflecting coating layer serves to lower the temperature of the laminate by reflecting the ultraviolet light incident on the laminate.

Referring to FIG. 1, the ultraviolet light-reflecting coating layer 200 is formed on the substrate layer 100. In this regard, the ultraviolet light-reflecting coating layer contains an expanded fluorine-based polymer and is porous. A fluorine-based polymer generally has a stronger bond than a hydrocarbon-based polymer. As the ultraviolet light-reflecting coating layer contains the expanded fluorine-based polymer, a resistance to ultraviolet light is further improved. In addition, because the ultraviolet light-reflecting coating layer is porous, there is an effect that an ultraviolet light reflection rate is improved.

The expanded fluorine-based polymer is prepared by expanding the fluorine-based polymer and has a porous structure. For example, the expanded fluorine-based polymer may include expanded polytetrafluoroethylene (ePTFE) obtained by expanding polytetrafluoroethylene (PTFE), which is a linear polymer containing fluorine and carbon. When the expanded fluorine-based polymer includes the ePTFE, there is an effect of increasing the reflection rate for the ultraviolet light.

In addition, the expanded fluorine-based polymer may have a weight-average molecular weight (Mw) in a range from $5.2 \times 10^5$ g/mol to $4.5 \times 10^7$ g/mol, specifically, in a range from $1.0 \times 10^6$ g/mol to $2.0 \times 10^6$ g/mol. When the weight-average molecular weight of the expanded fluorine-based polymer is within the above range, as an expansion rate of the ultraviolet light-reflecting coating layer increases, the ultraviolet light reflection rate is improved.

The ultraviolet light-reflecting coating layer may have a porosity in a range from 40% to 70% or in a range from 50% to 60%, and may have an average pore diameter in a range from 200 nm to 2 μm or in a range from 400 nm to 700 nm. When the porosity of the ultraviolet light-reflecting coating layer is less than the above range, the ultraviolet light reflection rate may decrease. When the porosity of the ultraviolet light-reflecting coating layer exceeds the above range, a commercial value may be lowered because of excessively contained pores. In addition, when the average diameter of the pores in the ultraviolet light-reflecting coating layer is less than the above range, the ultraviolet light reflection rate may decrease. When the average diameter of the pores exceeds the above range, the commercial value may be lowered because of an excessive diameter of the pores.

In addition, the ultraviolet light-reflecting coating layer may have an average thickness in a range from 20 μm to 200 μm or from 30 μm to 100 μm. When the average thickness of the ultraviolet light-reflecting coating layer is less than the above range, the ultraviolet light reflection rate may be reduced. When the average thickness of the ultraviolet light-reflecting coating layer exceeds the above range, economic feasibility may be lowered because a yield is small compared to the thickness of the ultraviolet light-reflecting coating layer.

The laminate for the radiational cooling may have a reflection rate in a range from 80 to 99% for a wavelength in a range from 200 nm to 400 nm and have a reflection rate in the range from 80% to 99% for a wavelength in a range from 400 nm to 700 nm. Specifically, the laminate for the radiational cooling may have a reflection rate in a range from 85% to 99% for the wavelength in the range from 200 nm to 400 nm and have a reflection rate in the range from 80% to 95% for the wavelength in the range from 400 nm to 700 nm. That is, the laminate for the radiational cooling has excellent reflection rates for the ultraviolet light having the wavelength in the range from 200 nm to 400 nm and the visible light having the wavelength in the range from 400 nm to 700 nm, so that the laminate for the radiational cooling is very suitable as a material for the radiational cooling.

In addition, the laminate for the radiational cooling may have an average thickness in a range from 50 μm to 600 μm or in a range from 200 μm to 500 μm.

The laminate for the radiational cooling according to the present disclosure as described above has excellent flexibility, has a thickness providing for easy control, and has excellent infrared light radiability and ultraviolet light reflectivity to have the excellent radiational cooling ability. Therefore, the laminate for the radiational cooling may be suitably used as a material in various fields requiring a material having the excellent radiational cooling ability, such as a vehicle.

Radiational Cooling Material

The radiational cooling material of the present disclosure contains the laminate for the radiational cooling.

As described above, the radiational cooling material contains the laminate for the radiational cooling excellent in the ultraviolet light and visible light reflectivity and excellent in the infrared light radiability, so that the radiational cooling material may be suitably used as the material in the various fields requiring the material with the excellent radiational cooling ability, such as the vehicle.

Vehicle

The vehicle of the present disclosure contains the radiational cooling material. For this reason, the vehicle is excellent in energy efficiency because it is possible to save cooling energy in summer.

Hereinafter, the present disclosure will be described in more detail through Examples. However, such Examples are only for helping the understanding of the present disclosure, and the scope of the present disclosure is not limited to such Examples in any sense.

EXAMPLES

Preparation Example 1. Preparation of Substrate Layer-1

The polycarbonate-based polyurethane (manufacturer: BASF, product name: Ellatollan, and Mw: 1,000 g/mol) as the infrared light-radiating polymer and $TiO_2$ (average particle diameter: 360 nm) as the visible light-reflecting inorganic material were mixed with each other in a weight ratio of 1:1, and then, applied and dried to prepare a substrate layer-1 having a thickness of 400 μm.

Example 1. Preparation of Laminate-1

An ePTFE film (manufacturer: goodfellow, product name: ePTFE, and thickness: 100 μm) was stacked on the substrate layer-1 of Preparation Example 1 as the ultraviolet light-reflecting coating layer to prepare a laminate-1 having a thickness of 500 μm.

Test Example 1. Evaluation of Radiational Cooling Performance

Figure 2:
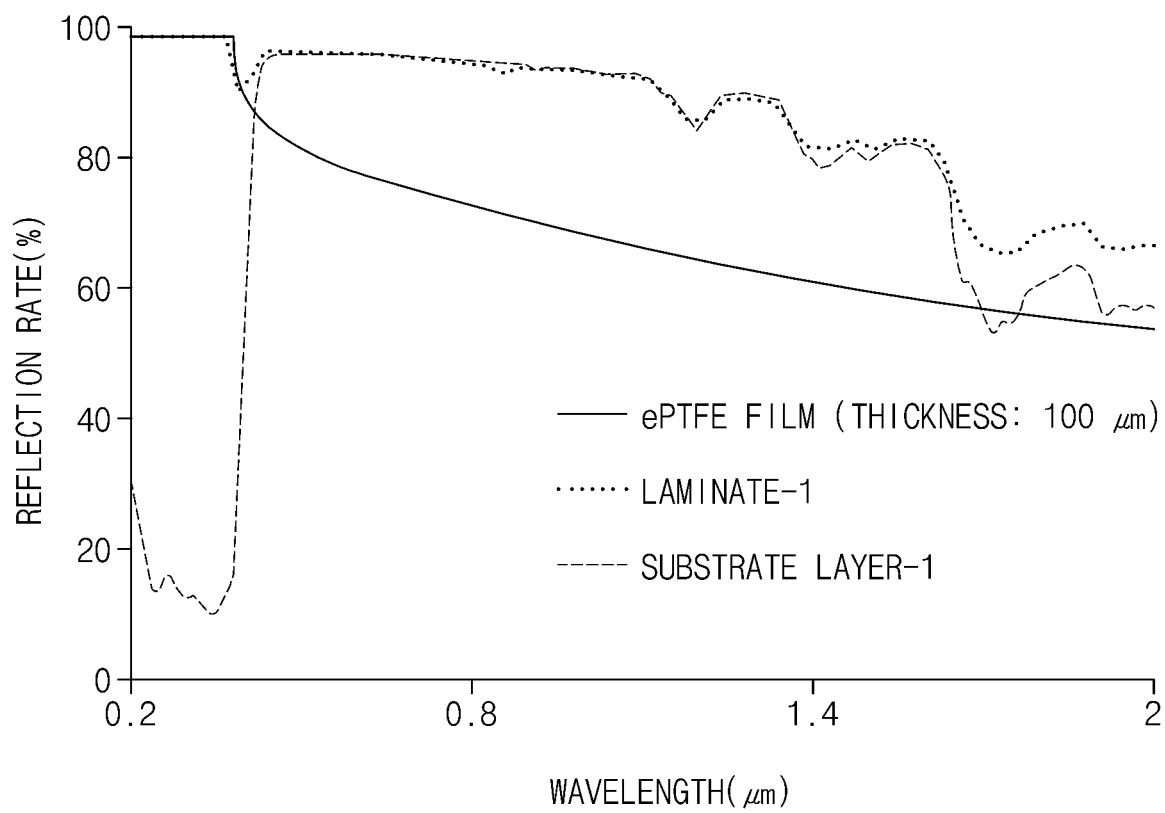
FIG. 2 is graph 250 of reflection rate of ultraviolet light and visible light measured in Example of the present disclosure.
Figure 3:
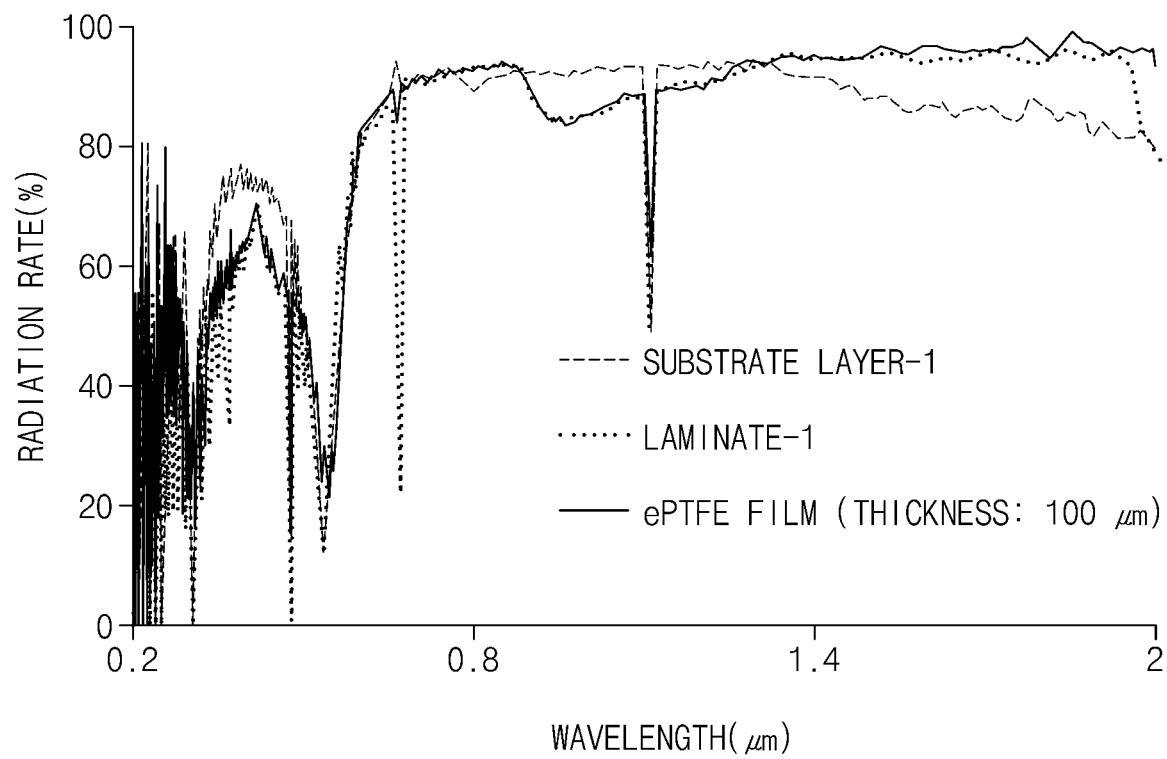
FIG. 3 is graph 350 of radiation rate of infrared light measured in Example of the present disclosure.

With respect to the substrate layer-1 of Preparation Example 1 and the laminate-1 of Example 1, a reflection rate for the wavelength in the range from 200 nm to 400 nm (the ultraviolet light) and a reflection rate for the wavelength in the range from 400 nm to 700 nm (the visible light), and a radiation rate for a wavelength in a range from 700 nm to 20 μm (the infrared light) were measured, and results thereof are shown in FIGS. 2 and 3.

As shown in graphs 250 and 350 in FIGS. 2 and 3, compared to the substrate layer-1 of Preparation Example 1, the laminate-1 of Example 1 has improved in the reflection rate for the wavelength in the range from 200 nm to 400 nm (the ultraviolet light). In addition, compared to the ePTFE film, the laminate-1 of Example 1 has improved in the reflection rate for the wavelength in the range from 400 nm to 700 nm (the visible light).

In addition, the substrate layer-1 of Preparation Example 1 and the laminate-1 of Example 1 were placed on a Styrofoam box, and a thermocouple was attached to each of contact surfaces between the substrate layer-1 of Preparation Example 1 and the Styrofoam box and between the laminate-1 of Example 1 and the Styrofoam box. After exposure to sunlight for 10 minutes, temperatures were measured.

TABLE 1

| Substrate layer-1 of Preparation Example 1 | Laminate-1 of Example 1 | Outside temperature |
|---|---|---|
| 42.1° C. | 30.3° C. | 36° C. |

As shown in Table 1, the temperature of the laminate-1 was lower than the outside temperature by 5 or more, and was very low compared to the temperature of the substrate layer-1.

Preparation Example 2. Preparation of Substrate Layer-2

The polycarbonate-based polyurethane (manufacturer: BASF, product name: Ellatollan, and Mw: 1,000 g/mol) as the infrared light-radiating polymer and $TiO_2$ (average particle diameter: 300 nm) as the visible light-reflecting inorganic material were mixed with each other in a weight ratio of 1:2, and then, applied and dried to prepare a substrate layer-2 having a thickness of 400 μm.

Preparation Example 3. Preparation of Substrate Layer-3

The polycarbonate-based polyurethane (manufacturer: BASF, product name: Ellatollan, and Mw: 1,000 g/mol) as the infrared light-radiating polymer and $TiO_2$ (average particle diameter: 300 nm) as the visible light-reflecting inorganic material were mixed with each other in a weight ratio of 1:3, and then, applied and dried to prepare a substrate layer-3 having a thickness of 400 μm.

Test Example 2. Evaluation of Radiational Cooling Performance

Figure 4:
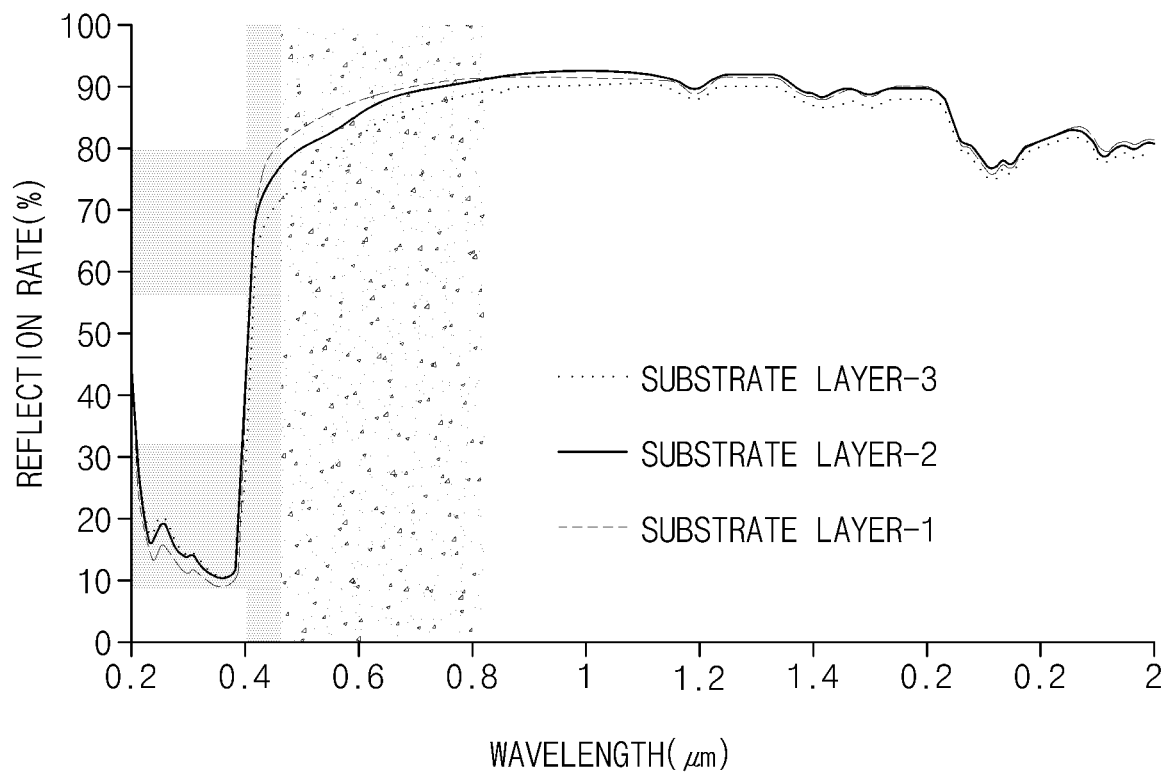
FIG. 4 is graph 450 of reflection rate of ultraviolet light and visible light measured in Example of the present disclosure.
Figure 5:
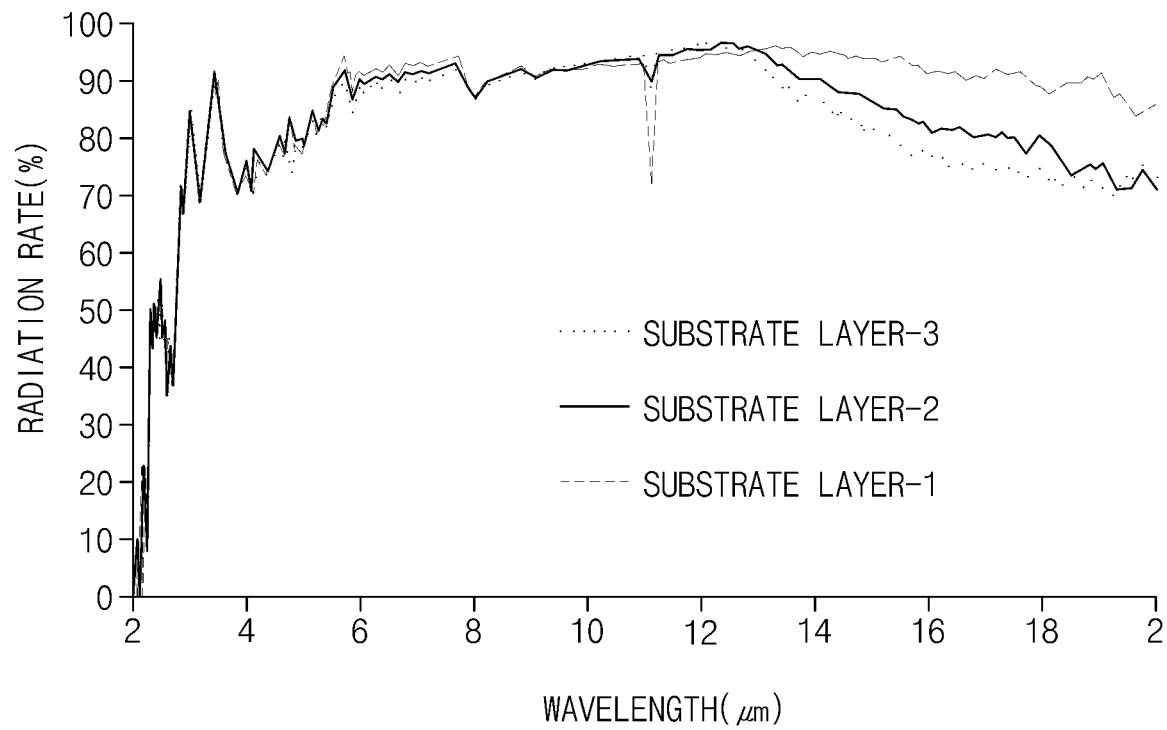
FIG. 5 is graph 550 of radiation rate of infrared light measured in Example of the present disclosure.

With respect to the substrate layer-1 of Preparation Example 1, the substrate layer-2 of Preparation Example 2, and the substrate layer-3 of Preparation Example 3, a reflection rate for the wavelength in the range from 200 nm to 400 nm (the ultraviolet light) and a reflection rate for the wavelength in the range from 400 nm to 700 nm (the visible light), and a radiation rate for the wavelength in the range from 700 nm to 20 μm (the infrared light) were measured, and results thereof are shown in FIGS. 4 and 5.

As shown in FIGS. 4 and 5, based on the weight ratio of the visible light-reflecting inorganic material and the infrared light-radiating polymer, as a weight ratio of the inorganic material decreases, the reflection rate for the visible light increased and the radiation rate for the infrared light increased.

Preparation Example 4. Preparation of Substrate Layer-4

The polycarbonate-based polyurethane (manufacturer: BASF, product name: Ellatollan, and Mw: 1,000 g/mol) as the infrared light-radiating polymer and $TiO_2$ (average particle diameter: 60 nm) as the visible light-reflecting inorganic material were mixed with each other in the weight ratio of 1:1, and then, applied and dried to prepare a substrate layer-4 having a thickness of 400 μm.

Preparation Example 5. Preparation of Substrate Layer-5

The polycarbonate-based polyurethane (manufacturer: BASF, product name: Ellatollan, and Mw: 1,000 g/mol) as the infrared light-radiating polymer and $TiO_2$ (average particle diameter: 1,000 nm) as the visible light-reflecting inorganic material were mixed with each other in the weight ratio of 1:1, and then, applied and dried to prepare a substrate layer-5 having a thickness of 400 μm.

Preparation Example 6. Preparation of Substrate Layer-6

The polycarbonate-based polyurethane (manufacturer: BASF, product name: Ellatollan, and Mw: 1,000 g/mol) as the infrared light-radiating polymer and $TiO_2$ (having an average particle diameter of 300 nm and having an average particle diameter of 1,000 nm were mixed in a weight ratio of 1:1 and used) as the visible light-reflecting inorganic material were mixed with each other in the weight ratio of 1:1, and then, applied and dried to prepare a substrate layer-6 having a thickness of 400 μm.

Test Example 3. Evaluation of Radiational Cooling Performance

Figure 6:
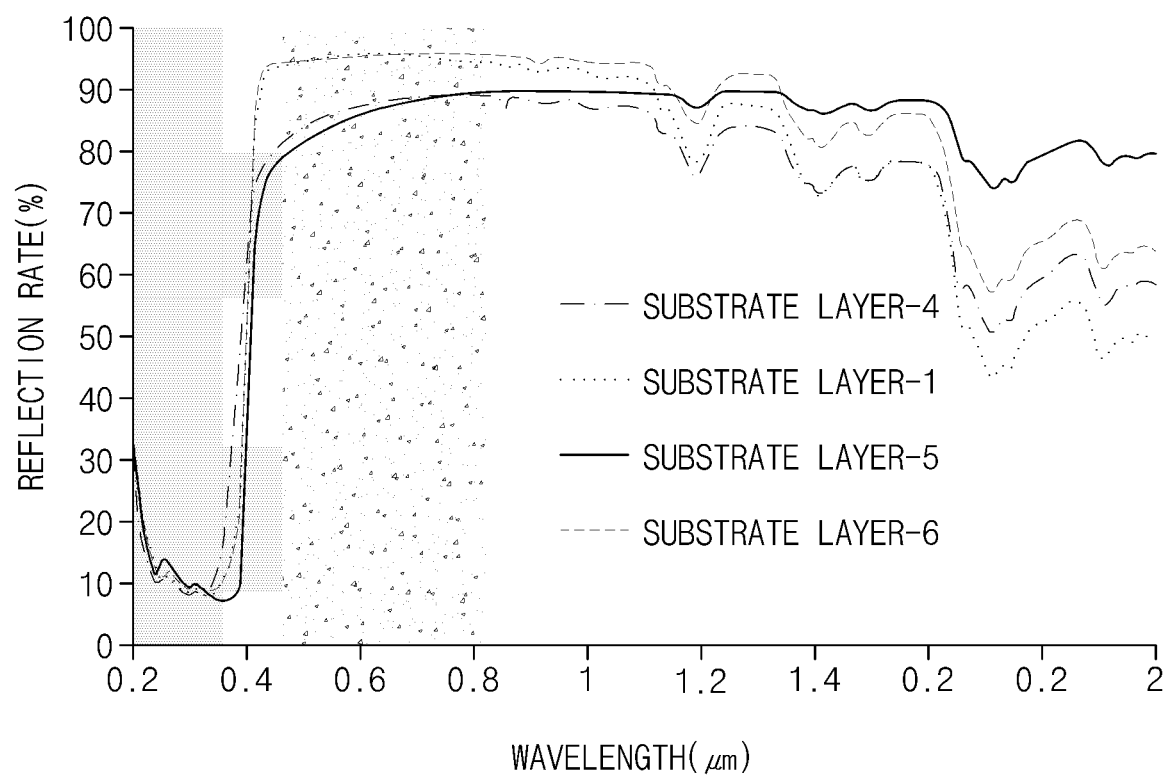
FIG. 6 is graph 650 of reflection rate of ultraviolet light and visible light measured in Example of the present disclosure.
Figure 7:
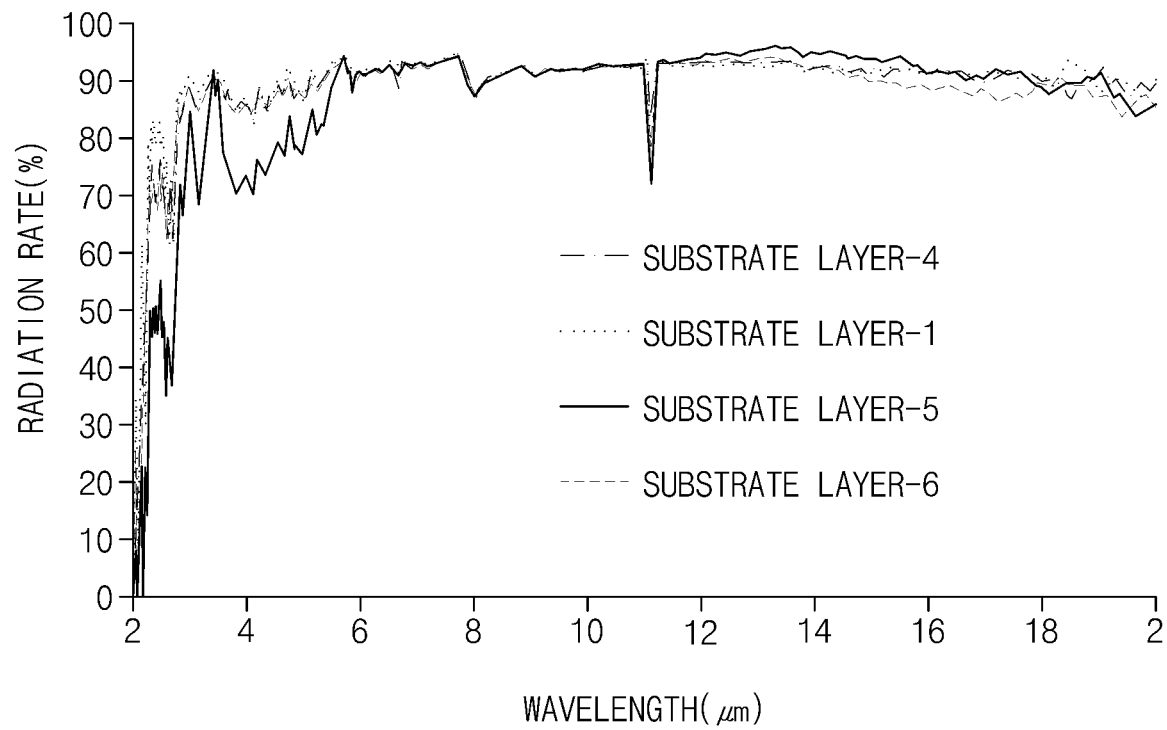
FIG. 7 is graph 750 of radiation rate of infrared light measured in Example of the present disclosure.

With respect to the substrate layer-1 of Preparation Example 1, the substrate layer-4 of Preparation Example 4, the substrate layer-5 of Preparation Example 5, and the substrate layer-6 of Preparation Example 6, a reflection rate for the wavelength in the range from 200 nm to 400 nm (the ultraviolet light) and a reflection rate for the wavelength in the range from 400 nm to 700 nm (the visible light), and a radiation rate for the wavelength in the range from 700 nm to 20 μm (the infrared light) were measured, and results thereof are shown in FIGS. 6 and 7.

As shown in graphs 650 and 750 FIGS. 6 and 7, the reflection rates for the ultraviolet light and the visible light and the radiation rate for the infrared light changed based on the average diameter of the particles of the visible light-reflecting inorganic material. In particular, the substrate layer-6 of Preparation Example 6, which used the mixture of the two types with the different average diameters as the visible light-reflecting inorganic material, had excellent visible light reflection rate and near infrared light radiation rate.

Preparation Example 7

A substrate layer was prepared using each of polypropylene, polycarbonate, a polyvinylidene fluoride-hexafluoropropylene copolymer, and polytetrafluoroethylene instead of the polycarbonate-based polyurethane as the infrared light-radiating polymer.

However, $TiO_2$ was not dispersed in the polymers or was not controlled in thickness, so that it was impossible to prepare the substrate layer.

Preparation Example 8

Figure 8:
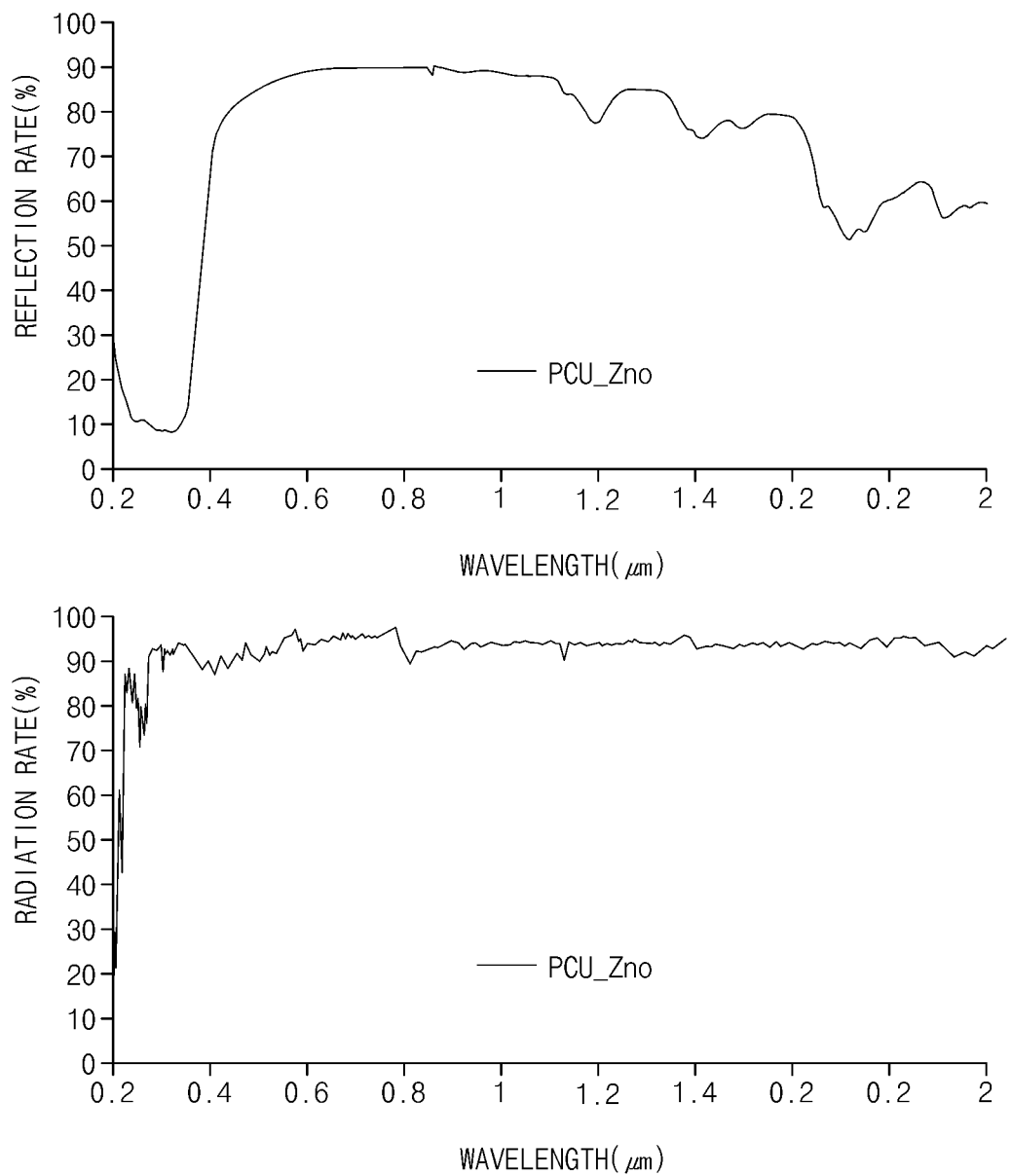
FIG. 8 shows a graph of a reflection rate of ultraviolet light and visible light and a graph of a radiation rate of infrared light measured in Preparation Example of the present disclosure.

After preparing a substrate layer-8 in the same manner as in Preparation Example 1 except that ZnO was used instead of $TiO_2$, a reflection rate for the wavelength in the range from 200 nm to 400 nm (the ultraviolet light), the reflection rate for the wavelength in the range from 400 nm to 700 nm (the visible light), and a radiation rate for the wavelength in the range from 700 nm to 20 µm (the infrared light) were measured, and results thereof are shown in graph 850 of FIG. 8.

As shown in FIG. 8, it was identified that, as ZnO also has excellent visible light reflexibility, ZnO is able to be used as the visible light-reflecting inorganic material.

The laminate for the radiational cooling according to the present disclosure has the excellent flexibility, is easy to be controlled in the thickness, and has the excellent infrared light radiability and ultraviolet light reflectivity to have the excellent radiational cooling ability. Therefore, the laminate for the radiational cooling may be suitably used as a material in various fields requiring a material having the excellent radiational cooling ability, such as a vehicle.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A laminate for radiational cooling, the laminate comprising:
a substrate layer containing a matrix of an infrared light-radiating polymer containing polycarbonate-based polyurethane and particles of a visible light-reflecting inorganic material; and
an ultraviolet light-reflecting coating layer formed on the substrate layer and containing an expanded fluorine-based polymer, wherein the ultraviolet light-reflecting coating layer is porous,
wherein the polycarbonate-based polyurethane has a weight-average molecular weight in a range from 450 g/mol to 4,500 g/mol.

2. The laminate of claim 1, wherein the visible light-reflecting inorganic material includes at least one selected from a group consisting of $TiO_2$, $SiO_2$, ZnO, $CaCO_3$, $BaSO_4$, and $Al_2O_3$.

3. The laminate of claim 1, wherein the particles of the visible light-reflecting inorganic material have an average particle diameter in a range from 50 nm to 1500 nm.

4. The laminate of claim 1, wherein the substrate layer contains the visible light-reflecting inorganic material and the infrared light-radiating polymer in a weight ratio of 0.5 to 5:1.

5. The laminate of claim 1, wherein the expanded fluorine-based polymer in the ultraviolet light-reflecting coating layer includes expanded polytetrafluoroethylene (ePTFE).

6. The laminate of claim 1, wherein the expanded fluorine-based polymer in the ultraviolet light-reflecting coating layer has a weight-average molecular weight in a range from $5.2 \times 10^5$ g/mol to $4.5 \times 10^7$ g/mol.

7. The laminate of claim 1, wherein the ultraviolet light-reflecting coating layer has a porosity in a range from 40% to 70% and an average thickness in a range from 20 µm to 200 µm.

8. The laminate of claim 1, wherein the substrate layer has an average thickness in a range from 200 µm to 1 mm.

9. The laminate of claim 1, wherein a reflection rate for a wavelength in a range from 200 nm to 400 nm is in a range from 80% to 99% and a reflection rate for a wavelength in a range from 400 nm to 700 nm is in a range from 80% to 99%.

10. A radiational cooling material containing the laminate for the radiational cooling of claim 1.

11. A vehicle containing the radiational cooling material of claim 10.

* * * * *